(12) United States Patent
Stabler et al.

(10) Patent No.: US 10,464,042 B2
(45) Date of Patent: Nov. 5, 2019

(54) ARTICLE WITH ZEOLITIC PARTICLES BONDED WITH RESIN

(71) Applicant: ARKEMA FRANCE, Colombes (FR)

(72) Inventors: Sean Michael Stabler, Pottstown, PA (US); Serge Nicholas, Lons (FR); Guillaume Ortiz, Pau (FR); Cécile Lutz, Gan (FR); Stéphane Kieger, Sartrouville (FR)

(73) Assignee: Arkema France, Colombes (FR)

( * ) Notice: Subject to any disclaimer, the term of this patent is extended or adjusted under 35 U.S.C. 154(b) by 108 days.

(21) Appl. No.: 15/738,424

(22) PCT Filed: Jul. 1, 2016

(86) PCT No.: PCT/IB2016/001101
§ 371 (c)(1),
(2) Date: Dec. 20, 2017

(87) PCT Pub. No.: WO2017/001935
PCT Pub. Date: Jan. 5, 2017

(65) Prior Publication Data
US 2018/0185817 A1    Jul. 5, 2018

Related U.S. Application Data

(60) Provisional application No. 62/188,089, filed on Jul. 2, 2015.

(30) Foreign Application Priority Data

Jul. 2, 2015  (FR) ..................... 15 56246

(51) Int. Cl.
*B01D 53/02*    (2006.01)
*B01J 20/18*    (2006.01)
(Continued)

(52) U.S. Cl.
CPC ............ *B01J 20/183* (2013.01); *B01D 53/02* (2013.01); *B01D 53/261* (2013.01); *B01J 20/12* (2013.01);
(Continued)

(58) Field of Classification Search
CPC ........ B01D 2253/104; B01D 2253/106; B01D 2253/108; B01D 2253/11; B01D 2253/25;
(Continued)

(56) References Cited

U.S. PATENT DOCUMENTS 5,856,264 A    1/1999  Cohen et al.
6,653,396 B2   11/2003 Nicolas et al.
(Continued)

FOREIGN PATENT DOCUMENTS

EP    0 170 299 A2    2/1986
EP    1 223 147 A1    7/2002
(Continued)

OTHER PUBLICATIONS

Atlas of Zeolite Framework Types, Fifth Revised Edition, 2001, Elsevier, published on behalf of the Structure Commission of the International Zeolite Association.
(Continued)

*Primary Examiner* — Christopher P Jones
(74) *Attorney, Agent, or Firm* — RatnerPrestia (57) ABSTRACT

The invention relates to an adsorbent article. The adsorbent article contains zeolitic particles which include at least one zeolitic adsorbent. The zeolitic particles are immobilized with at least one resin. According to one embodiment, the resin is in the form of particles, which can be melted to form bridges at points of contact between the zeolitic particles, thus immobilizing the zeolitic particles. The average size of the zeolitic particles can be between 0.03 mm and 3 mm. The zeolitic particles contain at least one zeolite and the zeolite
(Continued)

content of the article is at least 60 weight percent, based on the weight of the article. The invention also relates to a method for separating a fluid from another fluid or from impurities, by contacting the fluid with the adsorbent article.

20 Claims, 6 Drawing Sheets

(51) Int. Cl.
    *B01J 20/12*     (2006.01)
    *B01J 20/26*     (2006.01)
    *B01J 20/30*     (2006.01)
    *B01J 20/28*     (2006.01)
    *B01D 53/26*     (2006.01)

(52) U.S. Cl.
CPC ............. *B01J 20/26* (2013.01); *B01J 20/261* (2013.01); *B01J 20/262* (2013.01); *B01J 20/28004* (2013.01); *B01J 20/28026* (2013.01); *B01J 20/3007* (2013.01); *B01J 20/3042* (2013.01); *B01J 20/3078* (2013.01); *B01D 2253/104* (2013.01); *B01D 2253/106* (2013.01); *B01D 2253/108* (2013.01); *B01D 2253/11* (2013.01); *B01D 2253/25* (2013.01); *B01D 2253/304* (2013.01); *B01D 2253/34* (2013.01); *B01D 2256/12* (2013.01); *B01D 2257/102* (2013.01); *B01D 2259/4533* (2013.01)

(58) Field of Classification Search
CPC .......... B01D 2253/304; B01D 2253/34; B01D 2256/12; B01D 2257/102; B01D 2259/4533; B01D 53/02; B01D 53/261; B01J 20/12; B01J 20/183; B01J 20/26; B01J 20/261; B01J 20/262; B01J 20/28004; B01J 20/28026; B01J 20/3007; B01J 20/3042; B01J 20/3078
See application file for complete search history.

(56) References Cited

U.S. PATENT DOCUMENTS

| | | | |
|---|---|---|---|
| 6,743,745 | B2 | 6/2004 | Jaussaud et al. |
| 8,709,970 | B2 | 4/2014 | Blücher et al. |
| 9,587,202 | B2 | 3/2017 | Bouvier et al. |
| 9,744,519 | B2 | 8/2017 | Lutz et al. |
| 2006/0166819 | A1 | 7/2006 | Powers et al. |
| 2008/0011163 | A1 | 1/2008 | McClain |
| 2008/0148936 | A1 | 6/2008 | Baksh |
| 2011/0237424 | A1 | 9/2011 | von Blücher et al. |
| 2011/0259828 | A1 | 10/2011 | Bouvier et al. |
| 2012/0010070 | A1 | 1/2012 | Blücher et al. |
| 2012/0256120 | A1* | 10/2012 | Bouvier .................. C09K 5/045 252/68 |
| 2013/0116112 | A1 | 5/2013 | Garn et al. |

FOREIGN PATENT DOCUMENTS

| | | |
|---|---|---|
| EP | 2 561 917 A1 | 2/2013 |
| FR | 2 931 157 A1 | 11/2009 |
| JP | 2004238209 A | 8/2001 |
| JP | 2012508645 A | 4/2012 |
| WO | WO 2006/079713 A1 | 8/2006 |
| WO | 2008152319 A2 | 12/2008 |
| WO | WO 2012/143652 A1 | 10/2012 |
| WO | WO 2013/103433 A1 | 7/2013 |
| WO | WO 2014/055473 A1 | 4/2014 |
| WO | WO 2014/055546 A1 | 4/2014 |
| WO | WO 2014/182861 A1 | 11/2014 |

OTHER PUBLICATIONS

International Search Report for International Application No. PCT/IB2016/001101 dated Dec. 21, 2016.
Japanese Notice of Rejection for Japanese Application No. 2017-568158, dated Jan. 8, 2019, 5 pages.

* cited by examiner

Figure 1

Figure 1 bis

ARTICLE WITH ZEOLITIC PARTICLES BONDED WITH RESIN

CROSS-REFERENCE TO RELATED APPLICATIONS

This is the U.S. National Phase of International Application No. PCT/IB2016/001101, filed Jul. 1, 2016, which claims priority to French Application No. 1556246, filed Jul. 2, 2015, which claims priority to U.S. Provisional Application No. 62/188,089, filed Jul. 2, 2015. The disclosure of each of these applications is incorporated herein by reference in its entirety for all purposes.

FIELD OF THE INVENTION

The invention relates to an adsorbent article comprising particles of zeolite(s) and clay(s), said particles being bonded together with an organic resin(s), such as polymers, particularly thermoplastic polymers. The said adsorbent has a high zeolite content, is able to ensure a rapid diffusion of fluids, and allows for a better stability of the adsorbent, since attrition between the particles is reduced and even avoided since the particles are immobilized within the article.

BACKGROUND OF THE INVENTION

US 2006/0166819 discloses resin bonded sorbents used as air conditioning and refrigeration drying devices. The sorbent is added as a powder, e.g. zeolite powder, which is dispersed within a resin before injection or molding. The sorbent content is relatively low (from 25 wt % to 55 wt %) and adsorption kinetics are very slow, resulting in a material which is not well suited when high adsorption and desorption kinetics are requested.

WO 2014/055546 improves the above disclosure by creating some holes inside the composite material to quickly distribute the fluid to be dried and to increase the contact surface between the fluid and the material. The uptake of the moisture inside the material occurs relatively slowly, as required. Such materials are expected to have low density and low volumetric capacity. Here also, the sorbent content is low (5 wt % to 55 wt %) and adsorption kinetics remain slow.

WO 2013/103433 describes an article made of sorbents or catalytic beads bound onto a substrate (thin sheet or foil) with an adhesive, and spirally wound or planar arranged. Beads are regular adsorbents or catalysts. The article is proposed as a catalyst or a sorbent which is more effective for catalysis and adsorption because of a reduced pressure drop of the liquid or of the gas through the bed, compared to a packed bed. Such articles of sorbents bound on a substrate are rather difficult to produce because of plurality of components (sorbent, substrate and organic adhesive), and they may be of reduced resistance and there exist risks of peeling off or detachment of the sorbent from the substrate.

US 2008l0148936 discloses composite structured adsorbents comprising a multi-channel framework made of ceramics, various inorganic oxides and adsorbent materials. Each channel contains adsorbent particles which are not immobilized in the article and attrition between the said adsorbent particles are readily to occur.

SUMMARY OF THE INVENTION

There is therefore still a need for adsorbing articles (or else adsorbent articles) with high volumetric efficiency, with adsorption and desorption kinetics that are compatible, especially for uses where high adsorption kinetics are required, for example for gas and/or liquid dynamic separation, such as Pressure Swing Adsorption (PSA), Temperature Swing Adsorption (TSA), and the like.

Still a need exists for immobilized zeolitic particles in adsorbent beds to prevent any move of said particles, thus avoiding attrition and dust formation, while keeping a high separation efficiency (high volumetric capacity and high kinetics).

Again, there is a need for adsorbent articles (or blocks) with high zeolite content, low attrition behavior of the particles together, limited pressure drop and high diffusion kinetics.

The Applicant has now discovered that the above needs can be met in whole or at least in part with the adsorbent article of the present invention, which is now explained.

In a first embodiment, the present invention relates to an adsorbent article comprising zeolitic particles of at least one zeolitic adsorbent, said particles being immobilized with at least one resin, wherein the average particle size of the at least one zeolitic adsorbent ranges from 0.03 mm to 3 mm, preferably from 0.04 mm to 2 mm, more preferably from 0.05 mm to 1 mm, and wherein the zeolite content is equal to or greater than 60 wt %, more preferred when zeolite content is greater than 70 wt %, preferably strictly greater than 80 wt %, more preferably strictly greater than 85 wt %, still more preferably strictly greater than 88 wt %, typically equal to or greater than 90 wt %, relative to the total weight of the said article.

In the present description, all numerical ranges include the upper and lower limits, unless otherwise stated. In the present invention, "immobilized particles" means particles which exhibits reduced attrition due to immobility within the article and significant mechanical integrity to be self-supporting.

According to a first preferred aspect of the present invention, the zeolitic particles in the article comprise at least one zeolitic adsorbent in the form of zeolite(s) agglomerated with one or more inorganic binder. Inorganic binder is preferably chosen from, as non-limiting examples, natural clays, synthetic clays, silica, alumina, and the like, preferably natural clays and/or synthetic clays, more preferably natural clays. The presence of inorganic binder(s) is determined as explained herein-below.

The inorganic binder content in the article ranges from 0.2 to 30 wt %, preferably from 0.3 to 25 wt %, more preferably from 0.4 to 20 wt % and even more preferably from 0.5 to 9 wt %, relative to the total weight of the article.

The zeolitic particles present in the article of the present invention may have various forms and shapes, for example beads, pellets, extrudates, crushed beads, crushed pellets, flakes, cracks, and in general all types of shapes, rounded or not, hollowed or not, such as cenospheres as disclosed in U.S. Pat. No. 5,856,264, and the like and/or mixtures thereof.

According to a preferred embodiment, at least one zeolitic particle in the article has a dimension equal to or greater than 0.1 mm.

It thus should be understood that the expression "zeolitic particles" includes zeolitic adsorbents (agglomerates) and zeolite powder, the weight content of zeolite powder being lower than 90 wt %, preferably lower than 70 wt %, more preferably lower than 50 wt %, even more preferably lower than 25 wt %, still more preferably less than 10 wt % and even more preferably less than 5 wt %, relative to the total mass of the zeolitic particles. The weight ratio of zeolite powder to the total mass of the zeolitic particles is measured by sieving the zeolitic particles after dissolution of the resin, in an appropriate solvent. The zeolite powder weight amount is the amount of zeolite particles passing a 500 mesh sieve (31 µm).

The zeolitic particles within the article of the present invention comprise at least one zeolite or a mixture of zeolites, that is(are) advantageously chosen from among the A zeolites (framework type LTA), chabazite (framework type CHA), clinoptilolite (framework type HEU), EMT (framework type EMT), ZSM-5 (framework type WI), Silicalite-1 (framework type MEI) and faujasite (framework type FAU), and more preferably from among FAU type zeolites.

Among the FAU type zeolites, zeolites X, MSX, LSX and Y, as well as mixtures of two of more thereof in all proportions, are preferred. Zeolite X means a FAU type zeolite with a molar ratio Si/Al of between 1.15 and 1.50. Zeolite MSX (Medium Silica X) means a FAU type zeolite with a molar ratio Si/Al of between 1.05 and 1.15. Zeolite LSX (Low Silica X) means a FAU type zeolite with a molar ratio Si/Al equal to around 1.00±0.05. Zeolite Y means a FAU type zeolite with a molar ratio Si/Al higher than 1.50.

Among the MEI type zeolites, zeolite ZSM-5 means a MEI type zeolite with a molar ratio Si/Al higher than 10 and zeolite Silicalite-1 means a MEI type zeolite without aluminum.

All the above listed zeolites are for example depicted in Atlas of Zeolite Framework Types, Fifth Revised Edition, 2001, ELSEVIER, published on behalf of the Structure Commission of the International Zeolite Association.

The inorganic binder contained in the zeolitic particles is preferably chosen from kaolins, kaolinites, nacrites, dickites, halloysites, attapulgites, sepiolites, delaminated clays (for example as gels), montmorillonites, bentonites, illites and/or metakaolins as well as mixtures of two or more of them in any proportions.

Examples of delaminated clays which are commercially available are, for illustrative purpose only, Min-U-Gel®, Pansil®, Pangel®, Cimsil®, Attagel®, Actigel®, etc. Such gels are described e.g. in EP170299 or U.S. Pat. No. 6,743,745.

The article of the present invention thus comprises zeolitic particles that are immobilized with at least one resin. Examples of resins that are appropriate to immobilize the zeolitic particles in the article of the present invention include polymers, particularly thermoplastic homo- and/or copolymers and also polycondensates. Non limiting examples of polymers include polyolefins, especially low and/or high and/or ultra-high density polyethylene, polypropylene, ethylene copolymers, copolymers of ethylene-vinyl acetate, polyacrylics, acrylonitrile homo- and/or co-polymers, polyacrylates, polymethacrylates, acrylate copolymers and/or methacrylate copolymers, polystyrenes and/or styrene copolymers, polyesters, i.e. homo- and co-polyesters, e.g. polyethylene terephthalate, polybutylene terephtalate, halogenated polymers and copolymers such as poly(vinylidene difluoride)polymers (PVDF), poly(tetrafluoroethylene)polymers (PTFE) and/or copolymers thereof, other fluorinated homopolymers and copolymers, polyamides, i.e. homo- and co-polyamides, such as polyamide-11 and polyamide-12 as well as other even- and odd-numbered polyamides, aromatic polyamides, as described in WO 2014/182861 and in WO 2014/055473, polyvinylchlorides, polyurethanes, polyether sulfones, polyether ketones, polycarbonates, epoxy resins, phenolic resins, thermosetting resins and elastomeric resins, and the like as well as mixtures thereof.

Among polyamide copolymers mention may be made of polyether block polyamides, such as Pebax® sold by Arkema.

According to a first preferred embodiment, examples of resins that are appropriate to immobilize the zeolitic particles in the article of the present invention include ethylene copolymers, copolymers of ethylene-vinyl acetate, polyacrylics, acrylonitrile homo- and/or co-polymers, polyacrylates, polymethacrylates, acrylate copolymers and/or methacrylate copolymers, polystyrenes and/or styrene copolymers, polyesters, i.e. homo- and co-polyesters, e.g. polyethylene terephthalate, polybutylene terephtalate, halogenated polymers and copolymers such as poly(vinylidene difluoride)polymers (PVDF), poly(tetrafluoroethylene)polymers (PTFE) and/or copolymers, other fluorinated homopolymers and copolymers, polyamides, i.e. homo- and co-polyamides, such as polyamide-11 and polyamide-12 as well as other even- and odd-numbered polyamides, aromatic polyamides, as described above, polyvinylchlorides, polyurethanes, polyether sulfones, polyether ketones, and the like as well as mixtures thereof.

According to a second preferred embodiment, examples of resins that are appropriate to immobilize the zeolitic particles in the article of the present invention include copolymers of ethylene-vinyl acetate, polyesters, i.e. homo- and co-polyesters, e.g. polyethylene terephthalate, polybutylene terephtalate, halogenated polymers and copolymers such as poly(vinylidene difluoride)polymers (PVDF), poly(tetrafluoroethylene)polymers (PTFE) and/or copolymers, other fluorinated homopolymers and copolymers, polyamides, i.e. homo- and co-polyamides, such as polyamide-11 and polyamide-12 as well as other even- and odd-numbered polyamides, aromatic polyamides, as described above, polyurethanes, and the like as well as mixtures thereof.

According to a third preferred embodiment, examples of resins that are appropriate to immobilize the zeolitic particles in the article of the present invention include copolymers of ethylene-vinyl acetate, halogenated polymers and copolymers such as poly(vinylidene difluoride)polymers (PVDF), poly(tetrafluoroethylene)polymers (PTFE) and/or copolymers, other fluorinated homopolymers and copolymers, polyamides, i.e. homo- and co-polyamides, such as polyamide-11 and polyamide-12 as well as other even- and odd-numbered polyamides, aromatic polyamides, as described above, and the like as well as mixtures thereof.

Halogenated polymers are preferred, fluorinated polymers are more preferred and PVDF is even more preferred as those are compatible with the zeolitic particles to form the articles of the invention.

Preferred resins are those in the form of particles, preferably beads, agglomerates and aggregates of beads with preferred volumetric average particle size of less than 100 µm, preferably less than 50 µm, preferably less than 20 µm, more preferably less than 12 µm, and more preferably less than 10 µm.

As said above, resins may be chosen from polymers and in this case preferred polymers are those obtained by emulsion polymerization process resulting in small discrete particle size, typically ranging from 1 nm to 100 µm, preferably from 1 nm to 50 µm, more preferably from 1 nm to 20 µm. The volumetric average particle size of the resins is measured using a Microtrac S3500 analyzer. The particles are blended with deionized water and 1% Triton-X100 surfactant and sonicated before testing.

In the article of the present invention, the particle size ratio [(resin particle size) to (zeolitic particle size)] preferably ranges from 1:20000 to 3:1, preferably from 1:10000 to 2.5:1, more preferably from 1:1000 to 2:1.

Examples of resins may be organic adhesives or adhesive compositions or bonding agents, such as glues, contact adhesives, pressure sensitive adhesives, comprising one or more of the above listed thermoplastic homo- and/or copolymers and polycondensates.

As hereinbefore disclosed, the article of the present invention has a high content in active material (i.e. adsorbent material) expressed as the zeolite content which is equal to or greater than 60 wt % relative to the total weight of the said article, preferably the zeolite content is greater than 70 wt %, more preferably strictly greater than 80 wt %, still more preferably strictly greater than 85 wt %, even more preferably strictly greater than 88 wt %, typically equal to or greater than 90 wt %, relative to the total weight of the said article.

The quantitative amount of zeolite within the article is measured by X-ray diffraction as explained herein-below. This high content of adsorbent material allows for an article with a volumetric efficiency that is equal to 50% to 99%, more preferably 60 to 99%, still more preferably 70 to 99%, even more preferably 80 to 99%, of the free adsorbent material, i.e. without resin.

Volumetric efficiency is measured according to the analytical method explained herein below.

The resin content in the article of the present invention is measured through thermo-gravimetric analysis coupled with infrared spectrometry (TGA-IR). Analyses are performed for example in a METTLER Toledo TGA-DSC 2 apparatus, coupled with an infrared spectrometer NICOLET™ IR 6700. The sample is heated under air from ambient temperature (25° C.) to 1100° C., with a fixed temperature gradient (typically 5° C. per minute). Weight loss is recorded as a function of temperature and produced exhaust gas is analyzed by IR, allowing to calculate the resin content.

According to another aspect of the present invention, the adsorbent article of the present invention may additionally comprise one or more additives. Non limiting examples of such additives may be chosen from among rheology agents, pore-forming agents, processing aids, dispersing agents, lubricants, tackifiers, UV-stabilizers, pigments, dyes, antioxidants, impact modifiers, phase changing materials (PCM), flame retardants, odorizing agents and the like. According to one aspect of the invention, the adsorbent article may also comprise one or more compounds capable of changing color (colored indicator) according to the degree of adsorption of the zeolite(s). Such compounds are, for example, pigments, inks or dyes which chemically react while changing color (see WO 2006/079713 for examples of reactive inks).

The adsorbent article may be formed by conventional processing techniques such as injection molding, compression molding, extrusion, and the like, as non-limiting examples. Typically, the process preparation of the article of the present invention comprises at least the following steps:

a) blending zeolitic particles with at least one resin into a homogeneous mixture;
b) adding said homogeneous mixture to processing device;
c) forming into desired shape and size;
d) apply enough heat to soften resin;
e) apply pressure to pack particles to desired density;
f) temperature and pressure are held constant to allow binding of resin and zeolitic particles; and
g) cool until resin hardens.

Blending can be completed by frictional shear blending to smear the formulation into a homogeneous matrix either by hand or by mechanical means like a ribbon blender. "Processing device" means any forming device well known from the skilled artisan and may be, as non-limiting examples, chosen from among extruder, compression molder, injection molder, and the like.

The design of the mold for compression molding or die for continuous extrusion requires a relief designed into the tooling to allow easy extraction and transfer out of the forming tool. Such designs of molders and tooling are well known by the skilled in the art.

The blend of zeolitic particles with at least one resin obtained in step a) is also part of the present invention.

Preferred resins used during blending in step a) above, and that are present in the blend of zeolitic particles according to the invention are those in the form of particles, preferably beads, agglomerates and aggregates of beads with preferred volumetric average particle size of less than 100 μm, preferably less than 50 μm, preferably less than 20 μm, more preferably less than 12 μm, and more preferably less than 10 μm.

Resins used during blending in step a) above, and that are present in the blend of zeolitic particles according to the invention are advantageously chosen from polymers and in this case preferred polymers are those obtained by polymerized by emulsion polymerization process and are in the form of small discrete particle size, typically ranging from 1 nm to 100 μm, preferably from 1 nm to 50 μm, more preferably from 1 nm to 20 μm.

In the blend according to the present invention, obtained from step a) in the above process, the particle size ratio [(resin particle size) to (zeolitic particle size)] preferably ranges from 1:20000 to 3:1, preferably from 1:10000 to 2.5:1, more preferably from 1:1000 to 2:1.

It should be noted that steps b), c), d) and e) may be carried out in either order, concomitantly, one or two or more of these steps, or all of them, at the same time in one or more steps. Preferred carry out comprises steps b), c), d) and e), one after the other. Step f) comprises holding constant temperature and pressure for a period of time typically comprised between 1 second and 5 hours, preferably between 1 second and 1 hour. Step f) may also be optional in the process of the present invention.

The temperature of the extruder or compression molder forming die must be high enough to soften and allow the resin to adhere to the zeolitic particles, typically about 5 to 10° C. above the melting point or softening temperature of the resin. By way of non-limiting example, for semi-crystalline polymers the fusion temperature generally reaches a minimum of 5° C. above the melting point of the polymer crystallites. For amorphous polymers, the temperature generally reaches 5° C. above the softening temperature of the resin.

Pressure is applied during step e). Typical pressures can range from 15 psi (0.1 MPa) to 2500 psi (17 MPa), generally from 435 psi (3 MPa), to 2500 psi (17 MPa), depending on the desired final properties.

Once the article reaches suitable hardness it can be extracted from the mold or extruded out of the die. Suitable hardness depends on the resin chosen, for semi-crystalline polymers it is 5° C. or greater below the primary recrystallization temperature, which is the point where crystalline phases can be measured. For amorphous polymers, it is 5° C.

or greater below the hardness temperature where the polymer glass transition point occurs.

The article may have various shapes, e.g. chosen from among cubes, parallelepipeds, spheres, sheets, pleated sheets, films, pleated films, cylinders, convex regular polyhedrons, prisms, cones, ellipses, pyramids, wave shaped pattern, helical, and the like.

The article of the present invention, in its various shapes as listed above, may also include a variety of features used to increase surface area, e.g. protrusions (cones, cylinders, concentric circles, fins, fins with supports, and the like), bores (tapered and non-tapered bores, partial and through bores, may include cross sectional shapes such as circles, polygons, stars), see e.g. WO 2014/055546. The article may also include a variety of channels, which may be circular, polyhedral or sinusoidal in nature.

The various shapes as defined above allow for a better control of pressure drop within the article of the present invention, and thus allow reducing the energetic consumption of the purification/separation processes using the article of the present invention.

The article of the present invention thus allows for the complete immobilization of the sorbent particles, which therefore avoids attrition of the particles together and strengthens the period of the article usefulness.

According to a further embodiment the article has a mechanical resistance, expressed as compressive strength, ranging from 290 psi (2 MPa) to 14500 psi (100 MPa). According to still a further embodiment, the crushing strength of the article of the present invention is generally between 0.05 MPa to 50 MPa, preferably 0.05 MPa to 30 MPa, more preferably 0.05 MPa to 20 MPa. Compressive strength and crushing strength are determined according to techniques that are described herein-below.

The article of the present invention provides for good to excellent adsorption and desorption kinetics as required in a number of applications in need thereof.

As a further aspect, the present invention deals with a method for separating a fluid from one or more other fluid(s) and/or separating a fluid from impurities contained in said fluid, comprising the step of contacting said fluid with at least one article as herein-before described.

The invention further relates to the use of the adsorbent article as herein-before described for drying, conditioning, purifying and separating gases, liquids and vapours. Adsorbent articles used in such a way can be regenerated either by pressure swing adsorption processes, heat treatment or cleaning with solvents and subsequent drying.

The articles according to the invention can be used for drying compressed air for applications such as air braking systems. The articles according to the invention can furthermore be used in refrigerant drying. The articles according to the invention can also be used for drying and desulphurization of liquid hydrocarbons, for drying and sweetening of natural gas or for drying chemicals as for example alcohols or for drying petrochemicals, for example cracked gas.

A further application of the articles according to the invention can also encompass air separation in air separation units, in which nitrogen is adsorbed and air is enriched in oxygen, e.g. in respiratory air units. The articles according to the invention can furthermore also be used in air-conditioning units for drying the refrigerating fluid.

The articles according to the invention can also be used for air purification before cryogenic distillation, for $CO_2$ removal from air or from different natural or synthetic gases.

Finally, the shaped bodies according to the invention can be employed as ion exchangers in water-softening units, in which the desired effect is achieved by a calcium-sodium exchange.

BRIEF DESCRIPTION OF THE DRAWINGS

FIG. 1 bis is a SEM image of a cross-section of an article according to the present invention, as illustrated by FIG. 1. The article is prepared with 95 wt % of Siliporite® Nitroxy® SXSDM agglomerates (beads on the Figure) and 5 wt % of Dakota UNEX EVA T1 (grade 0-200 µm) resin. Beads are bound together with resin bridges at points of contact. One of the advantages of the resin bridges is that a large portion of the surface of the beads remains free from resin, thereby allowing an optimized volumetric efficiency.

Article (A) of FIG. 1 is illustrated in FIG. 2 which is a cross section view of an example of adsorbent cartridge (B). Cartridge (B) is an assembly of an article (A), which is inserted in a vessel (6) (made of polymer or metal such as aluminum), bearing a seal housing (7) between the article and the wall of the vessel, in order to prevent any channeling at the wall so that the fluid is forced through the article, and bearing caps (3, 3') tightly maintained by screws (4) and with seals (5) (O-rings represented). Flow at the inlet (10) is distributed through the flow distribution section (8) and filter (9). Purified or separated flow is produced at the outlet (11).

FIG. 3 is a cross section view of another example of a cartridge (C) using the article (A). The article is directly stuck to the containing vessel (14) thanks to the resin (2), avoiding any channeling so that the fluid is forced through the article. Caps (13, 13') are sealed to the containing vessel (14) and to the flow distribution section (12). Flow at the inlet (10) is distributed through the flow distribution section (12). Purified or separated flow is produced at the outlet (11).

FIG. 4 is a cross section view of an example of a cartridge (D) using the article (A). Cartridge (D) is an assembly of an article (A), which is inserted in a vessel (15) (made of polymer or metal such as aluminum), and caps (14) tightly maintained by screws (4). Flow at the inlet (10) is distributed from axial flow to radial flow. Purified or separated flow is produced at the outlet (11) from radial flow to axial flow.

DETAILED DESCRIPTION OF THE INVENTION

Figure 1:
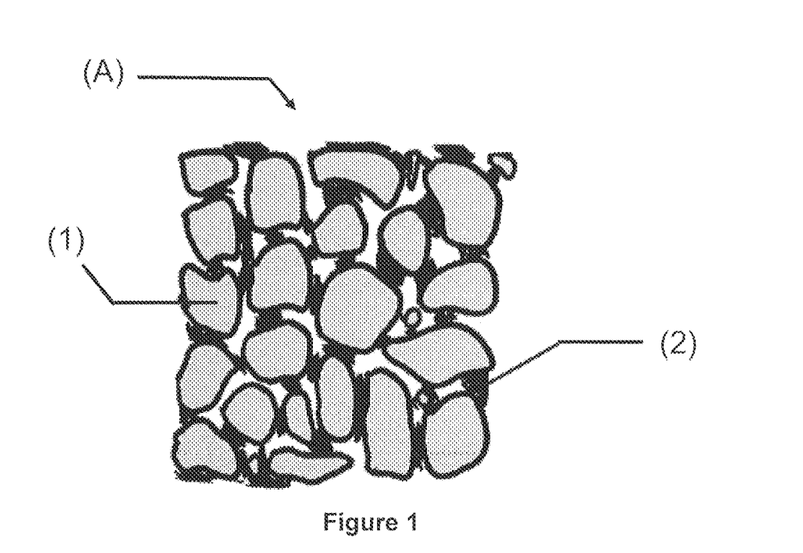
FIG. 1 is a cross section view of an example of an article (A) according to the present invention: the article comprises zeolitic particles (1), with at least one zeolitic adsorbent, the said particles which are immobilized with at least one resin (2).
Figure 2:
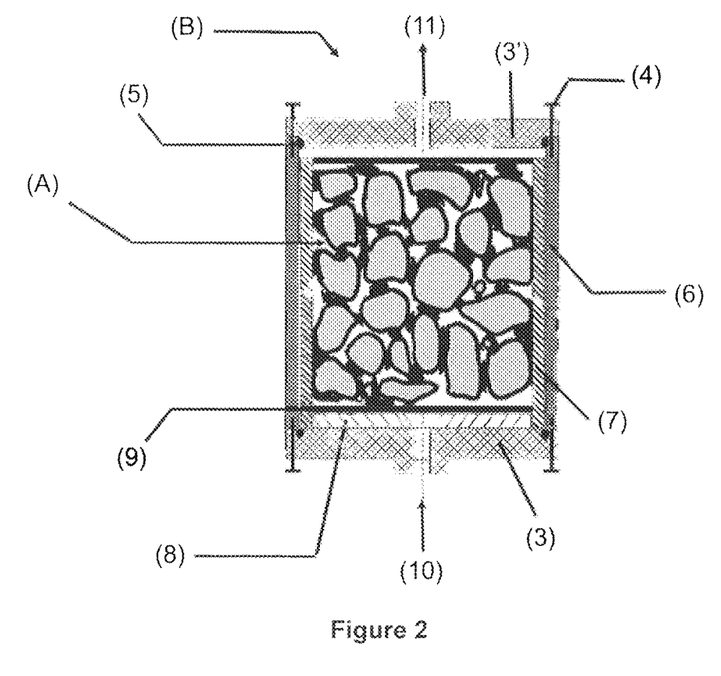
Figure 3:
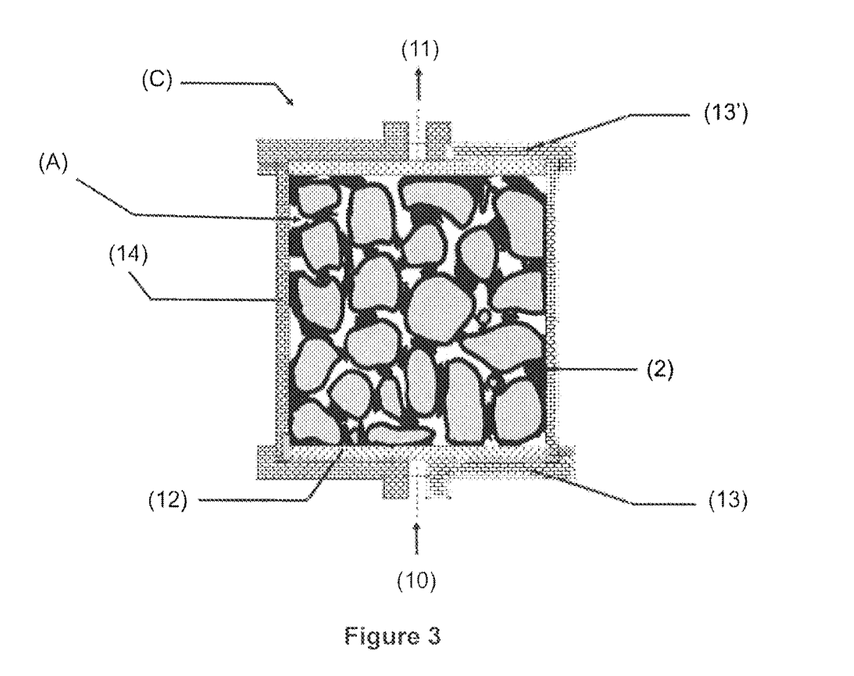
Figure 4:
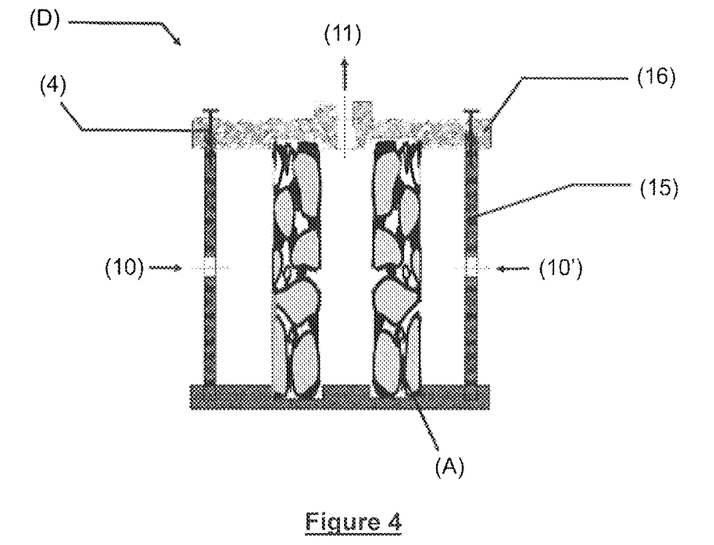
Figure 5:
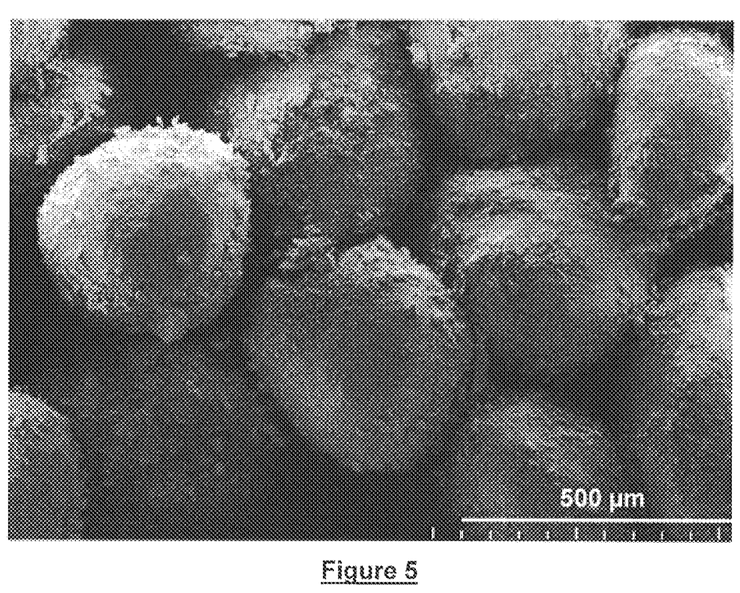
FIG. 5 is an SEM image of the dry formulation blend obtained at step a) of the process as described herein-before, i.e. prior to being immobilized with the compression molding process. The blend consists of 88 wt % of CECA's Siliporite® Nitroxy® SXSDM beads and 12 wt % of Arkema Kyblock™ FG-81 resin. The SEM image was performed by coating a thin layer of iridium using an ion beam coater from Southbay Technologies, model IBSe. SEM images were obtained with a Hitachi SU8010 field emission SEM. This image shows compatibility of fully dispersed coating of Kyblock™ FG-81 resin onto the surface of the Siliporite® Nitroxy® SXSDM beads.
Figure 6:
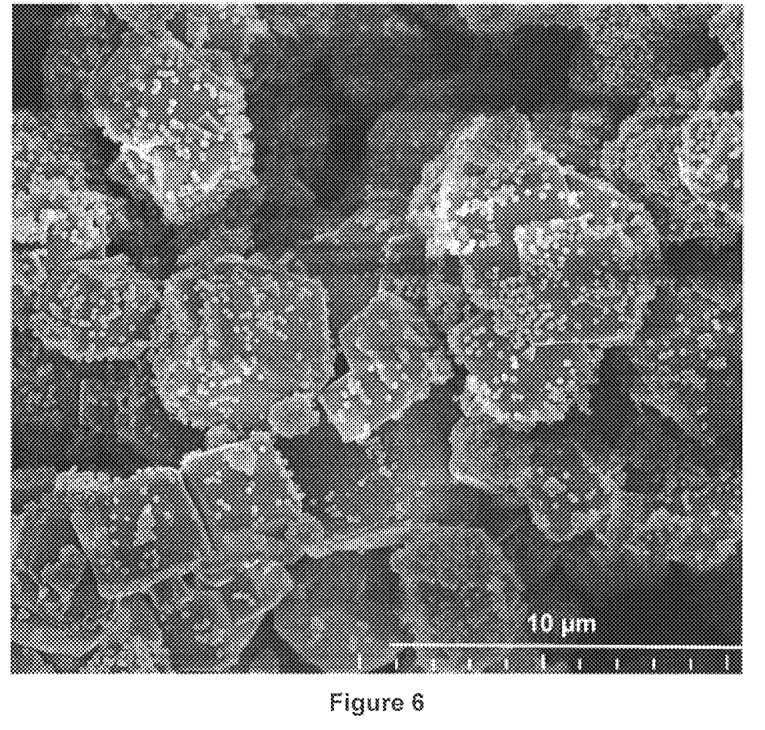
FIG. 6 is an SEM image of another example of a dry formulation blend obtained at step a) of the process as described herein-before, i.e. prior to being immobilized with the compression molding process, without inorganic resin. The blend consists of 88 wt % of CECA's Siliporite® NK30 zeolite powder and 12 wt % of Arkema Kyblock™ FG-81 resin. The SEM image was performed by coating a thin layer of iridium using an ion beam coater from Southbay Technologies, model IBSe. SEM images were obtained with a Hitachi SU8010 field emission SEM. This image shows compatibility of fully dispersed coating of Kyblock™ FG-81 resin onto the surface of the Siliporite® NK30 zeolite powder.

The invention is further illustrated with the following examples which do not aim at bringing any limitation to the sought scope of protection as shown in the annexed claims.

Example 1 is a compression molded cylinder shape adsorbent article according to the invention consisting 80 wt % of CECA Siliporite® Nitroxy® SXSDM beads (Lithium exchanged LSX zeolite) and 20 wt % of Arkema Kyblock™ FG-81 resin. The article of Example 1 has high bulk density and excellent mechanical integrity. To manufacture this article the 20 wt % of Arkema Kyblock™ FG-81 resin is added to 80 wt % of CECA Siliporite® Nitroxy® SXSDM beads having an average particle size of 0.52 mm. Kyblock™ FG-81 is sold as agglomerates of 1-10 µm volumetric average size, which agglomerates consist of resin particles of 150-300 nm average volumetric size.

The two components were manually mixed into a homogeneous mixture using a low shear swiping technique in a mixing bowl with a synthetic mixing paddle for 15 minutes until the binary blend is a homogeneous mixture. While mixing, the forming die is preheated in an oven to 180° C. Once the forming die reaches a 180° C. equilibrium temperature then the mixture is added into the forming die of 5.42 cm diameter and compressed with 87 psi (0.6 MPa) of pressure for 1 minute. The article is then manually extracted and placed into the 180° C. preheated oven for 5 minutes to fully cure the article. The article is then removed and allowed to cool to room temperature, in a closed vessel to prevent moisture adsorption by the article.

The final article has dimensions of 5.42 cm diameter and 3.95 cm height. The LSX zeolite content analysed by XRD is 66 wt % relative to the total weight of the article. The following characteristics of the article are determined according to the techniques described herein-below:
  Crushing strength value: 0.5 MPa.
  Attrition value: 0.6%.
  Volumetric efficiency: 0.130 g cm$^3$.

Example 2 is a compression molded cylinder shape adsorbent article consisting of 95 wt % of CECA Siliporite® Nitroxy® SXSDM beads and 5 wt % of Arkema Kyblock™ FG-81 resin. The article of Example 2 has high bulk density and excellent mechanical integrity. To manufacture this part the 5 wt % of Arkema Kyblock™ FG-81 resin is added to 95 wt % of CECA's Siliporite® Nitroxy® SXSDM beads. The LSX zeolite content analysed by XRD is 79 wt % relative to the total weight of the article.

The two components are manually mixed into a homogeneous mixture using a low shear swiping technique in a mixing bowl with a synthetic mixing paddle for 15 minutes until the binary blend is homogeneous. While mixing the forming die is preheated in an oven to 180° C. Once the forming die reaches a 180° C. equilibrium temperature then the mixture is added into the forming die of 5.42 cm diameter and compressed with 87 psi (0.6 MPa) of pressure for 1 minute. The article is then manually extracted and placed into the 180° C. preheated oven for 5 minutes to fully cure the article. The article is then removed and allowed to cool to room temperature, in a closed vessel to prevent moisture adsorption by the article. The final article has dimensions of 5.42 cm diameter by 3.59 cm height. The following characteristics of the article are determined according to the techniques described herein-below:
  Crushing strength value: 0.3 MPa.
  Attrition value: 0.8%.
  Volumetric efficiency: 0.168 g cm$^3$.

Example 3 is prepared according to the Example 1 with 95 wt % of CECA Siliporite® Nitroxy® SXSDM beads and 5 wt % of Dakota UNEX EVA T1 resin (grade 0-200 µm). The LSX zeolite content analysed by XRD is 79 wt % relative to the total weight of the article. The following characteristics of the article are determined according to the techniques described herein-below:
  Crushing strength value: 2.6 MPa.
  Attrition value: 1.3%.
  Volumetric efficiency: 0.164 g cm$^3$.

Example 4 is prepared according the Example 1 with 95 wt % of CECA Siliporite® Nitroxy® SXSDM beads and 5 wt % of Dakota UNEX EVA T1 resin (grade 0-80 µm). The LSX zeolite content analysed by XRD is 79 wt % relative to the total weight of the article. The following characteristics of the article are determined according to the techniques described herein-below:
  Crushing strength value: 1.3 MPa.
  Attrition value: 0.7%.
  Volumetric efficiency: 0.172 g cm$^3$.

Example 5 is prepared according the Example 1 with 95 wt % of CECA Siliporite® Nitroxy® SXSDM beads and 5 wt % of Arkema Orgasol® 2002 D NAT1 resin with a particles size 20±2 µm. The LSX zeolite content analysed by XRD is 79 wt % relative to is the total weight of the article. The following characteristics of the article are determined according to the techniques described herein-below:
  Crushing strength value: 2.0 MPa.
  Attrition value: 0.5%.
  Volumetric efficiency: 0.163 g cm$^3$.

Example 6 is prepared according the Example 1 with 95 wt % of CECA Siliporite® Nitroxy® SXSDM beads and 5 wt % of Arkema Orgasol® 2002 ES6 NAT3 resin with a particles size 60±3 µm. The LSX zeolite content analysed by XRD is 79 wt % relative to the total weight of the article. The following characteristics of the article are determined according to the techniques described herein-below:
  Crushing strength value: 2.2 MPa.
  Attrition value: 0.7%.
  Volumetric efficiency: 0.160 g cm$^3$.

Example 7 is the use of articles of the present invention in a stationary medical Oxygen concentrator sold by Philips Respironics named EverFlo™. Such medical oxygen concentrator uses a pressure swing adsorption (PSA) process to produce oxygen by extraction of the nitrogen from the ambient gas mixture, which generally is air. EverFlo™ concentrator uses two cylindrical cartridges filled with free zeolitic particles.

In a comparative experiment, the free zeolitic particles present in the cylindrical cartridges are replaced with two articles according to the present invention, wherein the zeolitic particles are bonded with resin particles. In this comparative test, the two articles are directly molded into the two cartridges of the EverFlo™ concentrator (same volume filling and compacting with 0.6 MPa pressure). The articles consist of 95 wt % of CECA Siliporite® Nitroxy® SXSDM beads and 5 wt % of Arkema Kyblock™ FG-81 as prepared in Example 2.

The concentrator is operated during 6 months (continuous operating with a produced flow rate set at a fixed value of 3 L min$^{-1}$). During the 6 months' period of continuous operating, the $O_2$ purity measured on the produced flow rate in both experiments is similar, thereby showing that the presence of resin bonding the zeolitic particles has no impact on the purity of the produced oxygen.

After the 6 months' period, the cartridges containing the articles of the present invention are opened and the presence of fines (dust) is visually assessed: it is observed that no dust is present in the cartridges and also no free beads is present in said cartridges.

Characterization Techniques

Morphology and Average Particle Size of Zeolitic Particles

Forms and shapes of the zeolitic particles (morphology) are observed by Scanning Electron Microscopy (SEM). The average particle size of the zeolitic particles present in the article is the number average of the largest dimension of the zeolitic particles observed by SEM.

Several photographs of polished cross-sections prepared by ion polishing are taken with a magnification at least equal to 50. The largest dimension of at least 200 zeolitic particles is measured thanks to a dedicated software, such as for example ImageJ (http://www.imagej.net). Precision is around ±3%.

Presence of Inorganic Binder in the Zeolitic Particles

The adsorbent article is immersed in a solvent selected to dissolve the resin or heated under air to decompose the resin by combustion. Zeolite nature(s) and concentration(s) in the resulting particles are measured by XRD. Inorganic binder(s) correspond to the remaining part of the article after elimination of the resin and substraction of the crystal part (zeolitic part).

In addition, polished cross-sections of the resulting particles are prepared by ion polishing. Analyses with Scanning Electron Microscopy coupled with energy dispersive X-ray spectrometry are carried out on the polished cross-sections to identify the different types of morphologies and the associated chemical compositions of each type of elements inside the particles (zeolite, binder). Inorganic binder(s) is the part of the particles which is not zeolitic.

Zeolite Content

The zeolite content, i.e. the total weight content of zeolitic part within the article, is determined by X-ray diffraction analysis, known to a person skilled in the art under the acronym XRD. This quantitative and qualitative analysis is carried out on a Bruker apparatus, by comparing the diffractograms of the article with the data from the ICDD databank and the amount of the zeolite or of each zeolite type is evaluated by means of the TOPAS software from Brucker. The zeolite weight content is equal to the sum of the contents of all the zeolites.

Volumetric Efficiency

Volumetric efficiency corresponds to the quantity of adsorbed water for cylinder-shaped sample of article having 5 cm in diameter and 3 cm height. The sample is placed during 24 hours in a closed vessel at 23° C.±2° C., having relative humidity of 50%, and as described in patent application EP1223147A.

Water adsorption values are measured by weighing the sample before and after this 24 hours' period. Volumetric efficiency is the weight increase of the sample divided by the volume of the cylinder (58.9 cm$^3$).

The sample may be a material according to the invention (article with zeolitic particles bonded with resin) or a sample of zeolitic particles without resin fulfilling a cylinder having same diameter and height, compacted under 1 MPa pressure.

Volumetric efficiency ratio is the ratio of the volumetric efficiency of the article of the present invention to the volumetric efficiency of the above described sample of zeolitic particles without resin.

Volumetric Average Particle Size of Resin (polymer) Particles

The volumetric average particle size is measured using a 100 mL glass beaker, and adding 0.5 g of resin particles directly to 2 mL of 10% Triton X-100 solution in water. The resin powder and surfactant are mixed well, then the mixture is diluted by adding 60 mL of deionized water to the beaker. The beaker is placed in a sonicator to break down the agglomerates while continuously agitating the solution to prevent powder settling. The solution is used to measure the particle size distribution in the Microtrac S3500 analyzer.

Mechanical Properties: Compressive Strength, Crushing Strength and Attrition Resistance Compressive strength: To determine the compressive strength of the article of the invention, a tensile/pressure tester from Zwick, model UP 1455 is employed. For this, cylindrical articles with a specimen diameter of 5 mm are cut to a specimen length of 7 mm. For exact and reproducible compressive strength measurements, it must be ensured that the front faces of the article are planar-parallel. The measurement is carried out at room temperature. The preliminary force is 1 N. The experiments are carried out at a test speed of 1 mm/min. The test force acts on the front faces.

Crushing Strength: To determine the crushing strength of the article of the invention, another tensile/pressure tester from Instron, model 4505, cell 10 kN S/N UK1280, is also employed for cylindrical articles with a specimen diameter of 60 mm and a specimen length of 10 mm. For exact and reproducible crushing strength measurements, it must be ensured that the front faces of the article are planar-parallel.

The measurement is carried out at room temperature. The experiments are carried out at a test speed of 1 mm/min, at room temperature (23° C.). The test force acts on the front faces through 150 mm plates.

Attrition resistance: a wet attrition test is performed in the following conditions: 136 mL of cylindrical articles with specimen diameter of 5 mm and a specimen length of 7.5 mm, are placed in a cylindrical 150 mL container having a diameter of 4.4 cm and a height of 10 cm. 68 mL of ethanol are added, the container is closed and subjected to high frequency swirling motion in a Model No. 30 Red Devil Paint Conditioner for 30 minutes. The fines produced by attrition are measured: the fines are thereafter washed from the article samples with ethanol through a 1.25 mm standard sieve into a beaker and isolated from the ethanol, heated to 80° C. to dry the fines and weighed. The obtained weight is expressed as a weight percent of the initial charge.

The invention claimed is:

1. An adsorbent article comprising zeolitic particles of at least one zeolitic adsorbent, wherein the zeolitic particles are in the form of zeolite(s) agglomerated with one or more inorganic binders, said zeolitic particles in the form of zeolite(s) agglomerated with one or more inorganic binders having a zeolite content and further being immobilized with at least one resin, wherein the average particle size of the at least one zeolitic adsorbent in the form of zeolite(s) agglomerated with one or more inorganic binders is between 0.03 mm and 3 mm, limits included, and wherein the zeolite content in the article is equal to or greater than 60 wt %, relative to the total weight of the said article.

2. The article according to claim 1, wherein the zeolitic particles in the article comprise at least one zeolitic adsorbent in the form of zeolite(s) agglomerated with one or more inorganic binder selected from the group consisting of natural clays, synthetic clays, silica, alumina, and mixtures thereof.

3. The article according to claim 1, wherein the zeolitic particles have forms and shapes, wherein the forms and shapes are selected from the group consisting of beads, pellets, extrudates, crushed beads, crushed pellets, flakes, cracks, rounded shapes, not rounded shapes, hollowed shapes, not hollowed shapes, cenospheres, and mixtures thereof.

4. The article according to claim 1, wherein at least one zeolitic particle in said article has a dimension equal to or greater than 0.1 mm.

5. The article according to claim 1, wherein said zeolite particles comprise at least one zeolite selected from the group consisting of A zeolites (framework type LTA), chabazite (framework type CHA), clinoptilolite (framework type HEU), EMT (framework type EMT), ZSM-5 (framework type MFI), Silicalite-1 (framework type MFI), and faujasite (framework type FAU), and mixtures thereof.

6. The article according to claim 5, wherein the FAU type zeolites are selected from the group consisting of zeolites X, zeolites MSX, zeolites LSX and zeolites Y, and mixtures thereof in all proportions.

7. The article according to claim 1, wherein the inorganic binder is selected from the group consisting of kaolins, kaolinites, nacrites, dickites, halloysites, attapulgites, sepiolites, delaminated clays, delaminated clays in the form of gels, montmorillonites, bentonites, illites, metakaolins, and mixtures thereof in any proportions.

8. The article according to claim 1, wherein the at least one resin is selected from the group consisting of polymers, thermoplastic homo-polymers, thermoplastic copolymers, polycondensates and mixtures thereof.

9. The article according to claim 1, wherein the at least one resin is selected from the group consisting of polymers, polyolefins, polypropylene, ethylene copolymers, copolymers of ethylene-vinyl acetate, polyacrylics, acrylonitrile homo-polymers, acrylonitrile co-polymers, polyacrylates, polymethacrylates, acrylate copolymers, methacrylate copolymers, polystyrenes, styrene copolymers, homo-polyesters, co-polyesters, halogenated polymers, halogenated copolymers, fluorinated homopolymers, fluorinated copolymers, homo-polyamides, co-polyamides, aromatic polyamides, polyvinylchlorides, polyurethanes, polyether sulfones, polyether ketones, polycarbonates, epoxy resins, phenolic resins, thermosetting resins, elastomeric resins, and mixtures thereof.

10. The article according to claim 1, wherein the weight of zeolite content relative to the total weight of the said article, is equal to or greater than 88 wt %.

11. The article according to claim 1 wherein the article has a shape selected from the group consisting of cubes, parallelepipeds, spheres, sheets, pleated sheets, films, pleated films, cylinders, convex regular polyhedrons, prisms, cones, ellipses, pyramids, wave shaped pattern, helical, and mixtures thereof.

12. The article according to claim 1, wherein the article comprises one or more features used to increase surface area, wherein the features are selected from the group consisting of protrusions, protruding cones, protruding cylinders, protruding concentric circles, protruding fins, protruding fins with supports, bores, tapered bores, non-tapered bores, partial bores, through bores, circular cross sectional shapes, polygonal cross sectional shapes, star cross sectional shapes, and combinations thereof.

13. The article according to claim 1, wherein the article comprises one or more channels, wherein the channels are circular, polyhedral, or sinusoidal.

14. The article according to claim 1, wherein the article has a mechanical resistance, expressed as compressive strength, between 290 psi (2 MPa) and 14500 psi (100 MPa), limits included.

15. A method for separating a fluid from one or more other fluid(s) or separating said fluid from impurities contained in said fluid, wherein the method comprises the step of contacting said fluid with at least one article according to claim 1.

16. The method according to claim 15, wherein the method comprises at least one of drying, conditioning, purifying, or separating, and the fluid is selected from the group consisting of gases, liquids, vapors, and mixtures thereof.

17. A blend comprising zeolitic particles having a zeolitic particle size, and resin particles having a resin particle size, wherein the resin particles are in the form of beads, agglomerates of beads, or aggregates of beads, and wherein the volumetric average resin particle size is less than 100 µm.

18. The blend according to claim 17, wherein the blend has a particle size ratio defined as the ratio of [(resin particle size):(zeolitic particle size)] that is between 1:20000 and 3:1, limits included.

19. The article according to claim 1, wherein the inorganic binder comprises at least one member selected from the group consisting of natural clays, synthetic clays, silica, and alumina.

20. The article according to claim 1, wherein said at least one resin comprises at least one member selected from the group consisting of copolymers of ethylene-vinyl acetate, homo- and co-polyesters, halogenated polymers and copolymers, homo- and co-polyamides, and polyurethanes.

* * * * *